April 2, 1957

E. A. STALKER 2,787,049

PROCESS OF FABRICATING BLADES
FOR TURBINES, COMPRESSORS
AND THE LIKE

Filed May 23, 1952

INVENTOR.
Edward A. Stalker

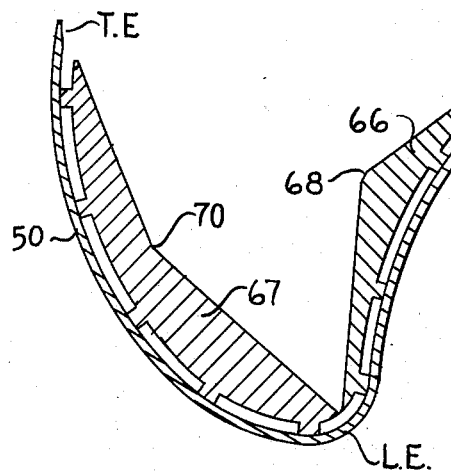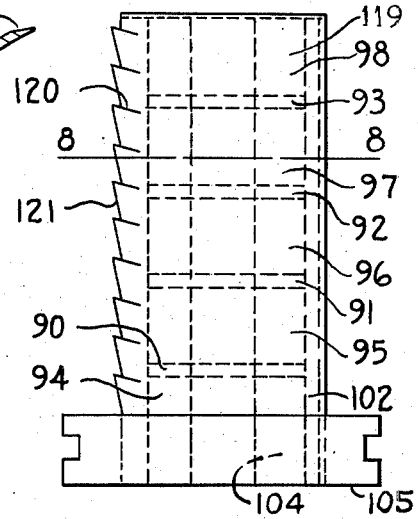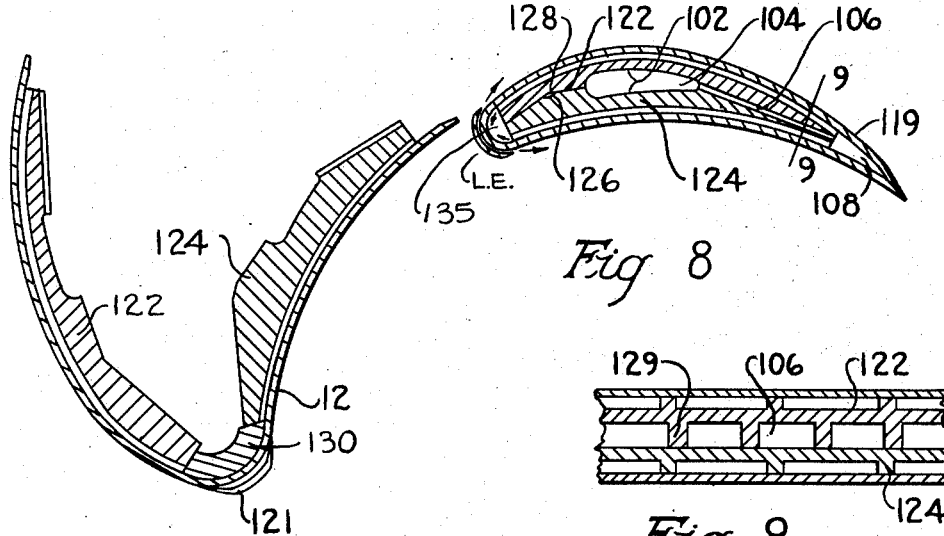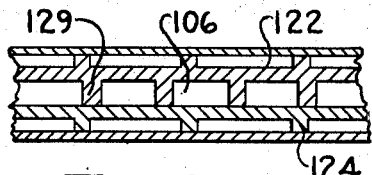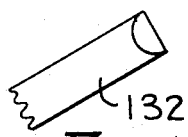

April 2, 1957

E. A. STALKER 2,787,049

PROCESS OF FABRICATING BLADES
FOR TURBINES, COMPRESSORS
AND THE LIKE

Filed May 23, 1952

INVENTOR.
Edward A. Stalker

United States Patent Office 2,787,049
Patented Apr. 2, 1957

2,787,049

PROCESS OF FABRICATING BLADES FOR TURBINES, COMPRESSORS AND THE LIKE

Edward A. Stalker, Bay City, Mich., assignor to The Stalker Development Company, Bay City, Mich., a corporation of Michigan Application May 23, 1952, Serial No. 289,600

5 Claims. (Cl. 29—156.8)

My invention relates to the production of blades for turbines, compressors, and the like and particularly to blades having internal attachments including ribs, splines, diaphragms, and the like.

An object of the invention is to provide a process of fabricating blades with parts fixed to the interior of the blades which is suited to large scale production.

Another object is to provide a process of fabricating blades with parts fused to the interior which process assures a subtsantially complete seal along a relatively large chordwise or spanwise extent.

It is still another object to provide a blade having an internal splined stem which is formed from a plurality of parts.

A still further object is to provide a blade having an internal stem which is formed of a plurality of parts adapted to key together.

Other objects will appear from the description, drawings and claims.

The above objects are accomplished by the means illustrated in the accompanying drawings in which—

Figure 2:
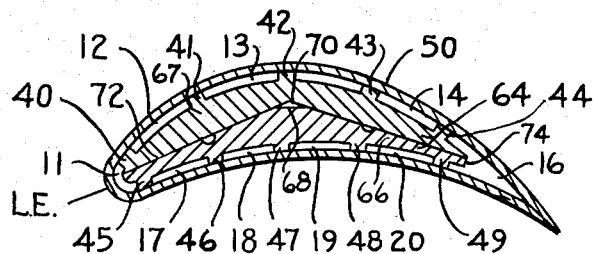
Fig. 2 is a section along line 2—2 in Fig. 1.
Figure 4:
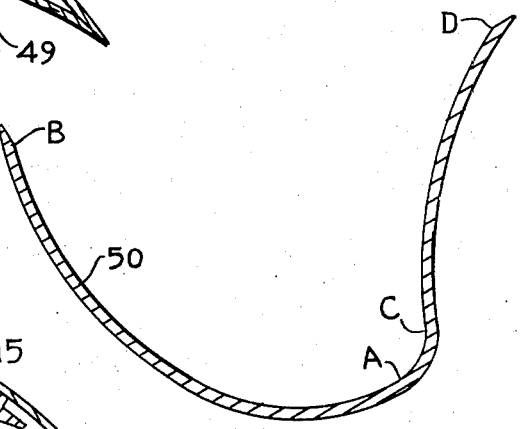
Figure 6:
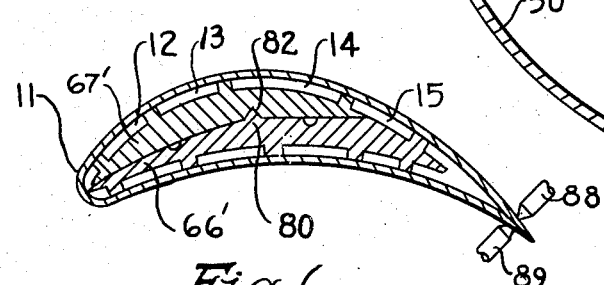
Figure 11:
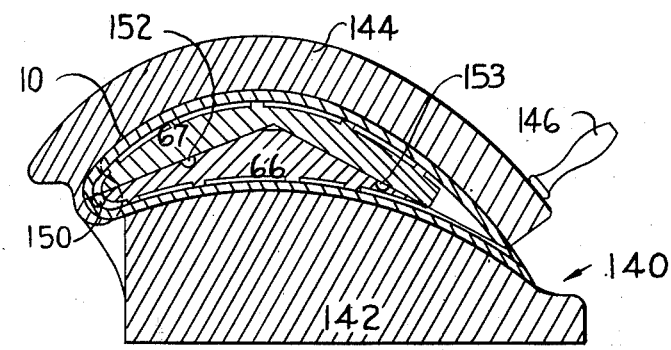
Figure 12:
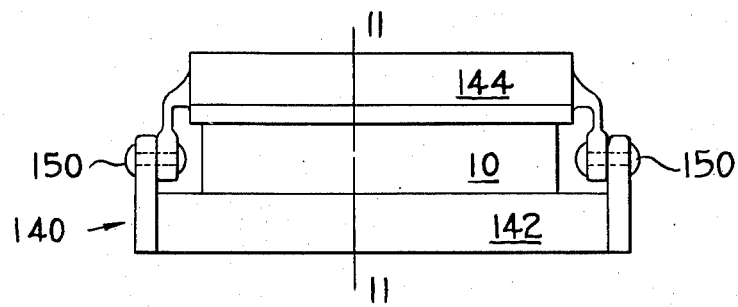
Figure 13:
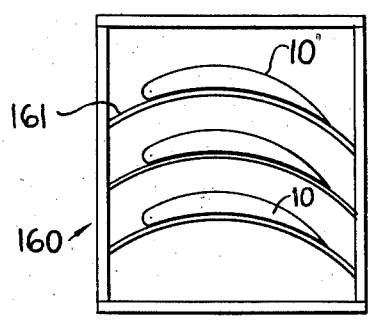
Figure 14:
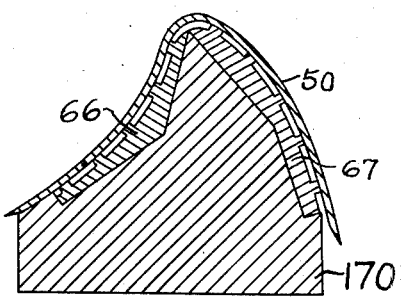

Fig. 4 displays the blade skin in section before it is finally formed to the blade section contour;

Fig. 5 shows the skin and stem parts in cross section corresponding to that of Fig. 2;

Fig. 6 is an alternate form of blade cross section;

Fig. 7 is a side elevation of a blade having nose slots and chordwise splines within according to this invention;

Fig. 8 is a section along line 8—8 in Fig. 7;

Fig. 9 is a section along line 9—9 in Fig. 8;

Fig. 10 shows the skin and stem parts before the skin is folded to the final blade form;

Fig. 10a is a perspective of a mandrel for insertion in the flute at the nose of the blade;

Fig. 11 is a section along line 11—11 in Fig. 12 of the folding machine;

Fig. 12 is a front elevation of a folding machine;

Fig. 13 is an end view of a rack for holding the blades during heating in a furnace; and Fig. 14 shows an alternate arrangement for soldering the skin to the stem parts wherein the skin is supported on the stem parts.

Figure 3:
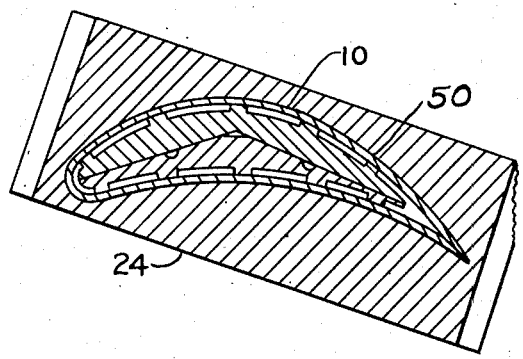
Fig. 3 is a section along line 3—3 in Fig. 1.
Figure 1:
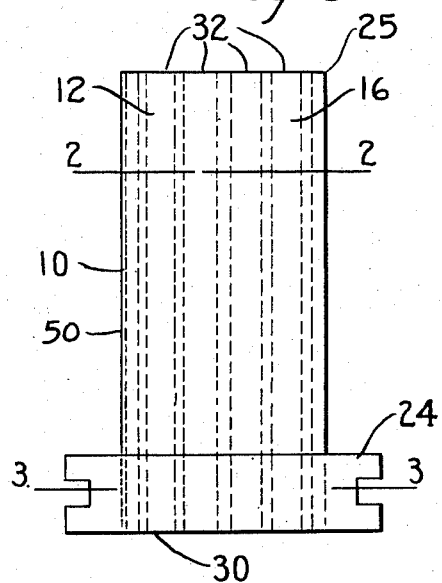
Fig. 1 is a side elevation of a blade according to this invention incorporating spanwise splines.

Figs. 1 to 3 display a blade 10 having a plurality of spanwise flutes 11–20 for conducting air from the base 24 to the tip 25. These flutes have inlets 30 at the base and exits 32 at the tip. It is desirable to fuse the splines 40–49 defining the flutes to the blade skin 50. This is difficult to accomplish with assurance of a continuous joint along the splines or with assurance that all desired localities are bonded.

The splines are distributed preferably over a major portion of the stem which itself extends chordwise along a major portion of the blade chord. Thus the stem has a plurality of splines on its front half as well as its rear half.

The ends of the splines conform as a group to a fair chordwise curve substantially corresponding to that of the inside contour of the contiguous skin.

In the present invention, a means of fabrication is presented which produces blades having the proper bonds between the blade skin and the inner parts, such as the splines, and which is adapted to large scale production with assurance that the bonding meets requirements.

According to this invention the blade skin or envelope 50 is first formed as shown in Fig. 4. The section contour from A to B is essentially precise. Also the contour from C to D is essentially precise as to final desired form. The contour from A to C is accurately formed but conforms to a contour of generally greater radii than the final or desired blade nose contour.

The skin 50 as shown in Fig. 4 has been formed by stretching so that there are no significant variations in internal stresses which would distort the precise contours AB and CD when the skin is heated.

The process for forming the skin 50 into the shape shown in Fig. 4 is described in the pending application Serial No. 282,012, filed April 12, 1952, by Daniel J. Clarke and Edward A. Stalker.

The stem 64 is formed in two parts 66 and 67 as shown particularly in Fig. 2 each carrying its respective splines. The lower portion 66 has the apex 68 which fits in the recess 70 of the upper part so as to key the parts together. The apex and recess combination represents a keying means to position the parts correctly and positively one relative to the other.

After the skin has been formed to the contour shown in Fig. 4, each part of the stem is placed against its respective portion of the skin, as shown in Fig. 5, with suitable soldering material, preferably Nicrobraze, copper, or the like, at the splines. This sub-assembly of blade skin and the stem portions is then heated to cause fusion or bonding of the splines to the skin.

Next the two portions of the skin are folded toward each other about the leading edge L. E. of the blade, and the trailing edges T. E. of the skin are fixed together as by spot welding, mechanical means, and the like.

The apex and recess of the stem parts correctly guide the parts into proper alinement to define the blade accurately. This the parts are self aligning and self-jigging to assure the correct contours. The stem parts then have their inner surfaces in faying relation suitable for joining by soldering.

With the trailing edges secured together, the blade is again heated to fuse the two stem portions together by soldering material along faying surfaces 72—74, Fig. 2 and preferably also along the trailing edge. Since the stem portions are keyed and the trailing edges are fixed together the parts are self sufficient in retaining accurately the desired form during the fusing or soldering operation.

In an alternate form of the stem shown in Fig. 6 there is a tongue 80 on the lower part 66′ and a groove 82 in the upper part 67′.

Fig. 6 shows the application of the electrodes 88 and 89 of a welding machine to the trailing edges to spot them together for the soldering operation.

Figs. 7 and 8 depict a turbine blade wherein the splines 90—93 of the blade stem 102 run chordwise as disclosed in my copending application Serial No. 247,468 filed Sept. 20, 1952. These splines define the flutes 94–98.

The blade stem 102 has the channel 104 for conducting cooling air or other coolant from the blade base 105 outward along the blade span. The coolant flows rearward through sub-channels 106 spaced along the span, into the trailing edge compartment 108 and then forward toward the leading edge L. E. through the flutes 94–98 between the splines. The coolant then issues from the nose slots 120 spaced apart spanwise in the skin 119. These slots define the platelets 121 therebetween.

As shown in Fig. 8 the upper part 122 of the stem is keyed to the lower part 124 by the apex 126 fitting into the recess 128.

The sub-channels 106 in Figs. 8 and 9 are defined by the partitions 129 which are integral with stem part 122 and are fused at their lower surfaces to stem part 124.

Referring to Fig. 10 the stem parts 122 and 124 are supported in position on the skin by the removable mandrel 130. This mandrel is removed before folding the parts on the other. It is preferably of ceramic material so that solder does not adhere to it.

Where there is a considerable length of unsupported nose skin as in Fig. 8, the nose contour is assured by inserting a mandrel 132 such as shown in Fig. 10a whose contour 133 corresponds to the inside contour of the skin at the nose. The mandrel extends spanwise and fills the space 135, for instance, in Fig. 8. The mandrel is withdrawn spanwise after the skin is folded and before the trailing edges are spot welded.

In this invention the upper and lower surfaces of the blade skin are formed accurately but are spaced apart so that the parts of the stem can be soldered to their respective surfaces. The soldering material can be placed along the splines and when it is melted it will flow to the joints to be soldered. Since the skin is accurately formed and is free of internal variations in stress the splines will everywhere be close enough to the inner surfaces of the skin to assure a sound joint. The gaps between the splines and the skin should be less that 0.003 inch if the soldering material is to fill the gap by capillary action.

The stem parts are preferably machined from stress relieved material or are stress relieved by heating before assembly on the skin surface.

Figs. 11 and 12 disclose the machine 140 for folding the upper segment of the blade onto the lower segment.

The blade in the soldered condition shown in Fig. 5 is placed with its lower surface against the machine base 142 with the folding bar 144 raised and rotated to the left. The bar is then brought to the position shown by pressure on the handle 146. During this operation the upper and lower stem parts are guided into proper relation by the shape of their mating surfaces.

The bar 144 is pivoted by pins 150 at each end of the machine, the center lines of the pins coinciding with the centers of the radii of the nose sections of the blade at their respective ends.

By properly shaping the upper surfaces of base 142 and properly locating the centers of pivots 150 at the ends of the machine, blades of varying taper can be folded.

The blade is removed from the folding machine and the trailing edges of the skin are fixed together preferably by spotwelds therealong as shown in Fig. 6.

The blade is then heated to melt the soldering material which has been placed at the proper localities. This is done preferably in a furnace with a special atmosphere such as hydrogen.

The soldering material is preferably placed in the grooves 152 and 153, and in the free space 154 at the apex of the part 67. When the material melts it will flow by capillary action between the faying surfaces of parts 66 and 67 fusing them together.

For passing through the furnace the blades are simply stacked in frames 160 on cross rods 161, shown in Fig. 13. That is, no special jigging is required to restrain the blade surfaces.

After the surfaces of the blade are fused together the trailing edge is finished to the desired thickness and shape by such methods as cutting or grinding.

In folding the blade 119 of Fig. 8 skins are placed in the slots 120 to keep them open.

As shown in Fig. 14 the skin 50 may also be soldered to the stem parts by laying the skin over the stem parts 66 and 67 which are supported on the fixture 170. This arrangement has the advantage that the fixture comprises only plane surfaces which are cheaply made.

The soldering material may be placed in the flutes of the stem parts and when melted, it flows along the surfaces of the splines to the joints with the skin. The capillary flow along the surfaces, even upward for relatively great distances is well known. The soldering material in the form of a powder may also be mixed with plastic cements and attached to the skin as is also well known.

While I have illustrated specific forms of the invention, it is to be understood that variations may be made therein and that I intend to claim my invention broadly as indicated by the appended claims.

I claim:

1. A process for fabricating a blade of airfoil contour for turbines, compressors, and the like comprising the steps of placing a splined stem part in faying relation with the lower wall of the blade sheet metal skin with the stem splines bearing on the inner surface of said wall and thereby defining a plurality of passages between said skin and said stem part, placing another splined stem part with the splines thereof in faying relation with the inner surface of the upper wall of said blade skin and thereby defining a plurality of passages between said skin and said stem part, said upper and lower walls of said skin being integral across the blade leading edge and spaced apart at their trailing edges, fusing said stem parts to said walls along said splines and thereafter folding said skin about the leading edge of the blade bringing said stem parts into faying relation and bonding said parts together.

2. A process for fabricating a blade of airfoil contour for turbines, compressors, and the like comprising the steps of placing a splined stem part in faying relation with the lower wall of the blade sheet metal skin with the stem splines bearing on the inner surface of said wall and thereby defining a plurality of passages between said skin and said stem part, placing another splined stem part with the splines thereof in faying relation with the inner surface of the upper wall of said blade skin and thereby defining a plurality of passages between said skin and said stem part, said upper and lower walls of said skin being integral across the blade leading edge and spaced apart at their trailing edges, fusing said stem parts to said walls along said splines and thereafter folding said skin about the leading edge of the blade bringing said stem parts into faying relation and bonding said parts together and the trailing edges of the upper and lower walls together.

3. A process for fabricating a blade of airfoil contour for turbines, compressors, and the like comprising the steps of placing a splined stem part in faying relation with the lower wall of the blade sheet metal skin with the stem splines bearing on the inner surface of said wall and thereby defining a plurality of passages between said skin and said stem part, placing another splined stem part with the splines thereof in faying relation with the inner surface of the upper wall of said blade skin and thereby defining a plurality of passages between said skin and said stem part, said upper and lower walls of said skin being integral across the blade leading edge and spaced apart at their trailing edges, fusing said stem parts to said walls along said splines and thereafter folding said skin about a mandrel at the leading edge of the blade bringing said stem parts into faying relation, and bonding said parts together.

4. A process of fabricating a blade for turbines, compressors and the like comprising the steps of placing splined stem parts in side-by-side relation on a fixture with the splines facing outward and the nose portions of said parts adjacent to each other, forming a blade skin with the upper and lower side walls thereof of precise chordwise contour and spaced apart at the trailing edges and joined together by a nose portion of selected chordwise contour, laying said blade skin on said stem parts with the inner surface of said skin faying said splines and with the nose portion of said skin positioned adjacent to said nose portions of said parts, heating and bonding said skin to said splines while said skin and splines are supported by said fixture, bending said skin at the nose thereof bringing said stem parts and the trailing edges of said skin into registration, and thereafter bonding said stem parts together and said trailing edges together.

5. A process of fabricating a blade for turbines, compressors, and the like comprising the steps of placing splined stem parts in side-by-side relation on a fixture with the splines facing outward and the nose portions of said parts adjacent to each other, laying a blade skin on said stem parts with the inner surface of said skin faying said splines and with the nose portion of said skin positioned adjacent to said nose portions of said parts, heating and bonding said skin to said splines while said skin and splines are supported by said fixture, bending said skin at the nose thereof bringing said stem parts and the trailing edges of said skin into registration, and thereafter bonding said stem parts together and said trailing edges together.

References Cited in the file of this patent

UNITED STATES PATENTS

| | | |
|---|---|---|
| 1,177,320 | Grabowsky | Mar. 28, 1916 |
| 1,817,556 | Hamilton | Aug. 4, 1931 |
| 1,991,582 | Sterling | Feb. 19, 1935 |
| 2,006,339 | Beumann | July 2, 1935 |
| 2,202,014 | Lougheed | May 28, 1940 |
| 2,347,034 | Doraw | Apr. 18, 1944 |
| 2,477,375 | Jablonsky | July 26, 1949 |
| 2,511,858 | Lampton | June 20, 1950 |
| 2,512,264 | Brauchler | June 20, 1950 |
| 2,540,709 | Burton | Feb. 6, 1951 |
| 2,641,440 | Williams | June 9, 1953 |
| 2,648,520 | Schmitt | Aug. 11, 1953 |
| 2,660,401 | Hull | Nov. 24, 1953 |
| 2,699,598 | Daugherty | Jan. 18, 1955 |

FOREIGN PATENTS

| | | |
|---|---|---|
| 369,478 | Great Britain | Mar. 24, 1932 |
| 789,671 | France | Nov. 4, 1935 |
| 546,176 | Great Britain | July 1, 1942 |
| 52,856 | Netherlands | July 15, 1942 |
| 625,693 | Great Britain | July 1, 1949 |